United States Patent [19]
Hoffman et al.
[11] 4,371,634
[45] Feb. 1, 1983

[54] MICROCAPSULE-CONTAINING WAX COMPOSITION

[75] Inventors: Dietrich Hoffman, Roedersheim-Gronau; Wolfgang Sliwka, Weinheim, both of Fed. Rep. of Germany

[73] Assignee: BASF Aktiengesellschaft, Rheinland-Pfalz, Fed. Rep. of Germany

[21] Appl. No.: 321,709

[22] Filed: Nov. 16, 1981

[30] Foreign Application Priority Data

Nov. 24, 1980 [DE] Fed. Rep. of Germany ....... 3044113

[51] Int. Cl.$^{3}$ .............................................. C08L 61/28

[52] U.S. Cl. .................................. 523/208; 282/27.5; 252/316; 523/205; 523/223; 524/275; 524/276; 524/277; 524/279; 524/487; 524/488; 524/489

[58] Field of Search ............... 524/275, 276, 277, 279, 524/487, 488, 489; 523/208, 205, 210, 223; 428/488; 282/27.5; 252/316

[56] References Cited

U.S. PATENT DOCUMENTS

| | | | |
|---|---|---|---|
| 3,016,308 | 8/1957 | Macaulay | 428/320.6 |
| 3,079,351 | 2/1963 | Staneslow et al. | 428/321.1 |
| 3,516,941 | 6/1970 | Matson | 523/208 |
| 4,162,165 | 7/1979 | Schwab | 428/327 |
| 4,171,981 | 10/1979 | Austin et al. | 428/488 |
| 4,235,458 | 11/1980 | Austin et al. | 428/488 |

FOREIGN PATENT DOCUMENTS

| | | |
|---|---|---|
| 26914 | 4/1981 | European Pat. Off. . |
| 1568663 | 3/1970 | Fed. Rep. of Germany . |
| 2719914 | 11/1977 | Fed. Rep. of Germany . |
| 2818976 | 11/1978 | Fed. Rep. of Germany . |
| 2820600 | 12/1978 | Fed. Rep. of Germany . |
| 2826939 | 1/1979 | Fed. Rep. of Germany . |
| 1318519 | 1/1963 | France . |
| 48-12255 | 5/1973 | Japan . |
| 2021512 | 12/1979 | United Kingdom . |
| 1570042 | 6/1980 | United Kingdom . |
| 1581757 | 12/1980 | |

OTHER PUBLICATIONS

Derwent Japanese Patents Report, vol. U, No. 17, Old-Law, issued May 29, 1973, Section G, p. 2, Auszug 23965U & JP-B-73, 12255, (Honshu Paper Mfg. Co. Ltd.), (11-26-69).

*Primary Examiner*—Lewis T. Jacobs
*Attorney, Agent, or Firm*—Oblon, Fisher, Spivak, McClelland & Maier

[57] ABSTRACT

A microcapsule-containing wax composition, which comprises (a) microcapsules of from 2 to 10 μm diameter, (b) waxes and (c) dispersants, with or without pigments, fillers, volatile constituents and other agents conventionally present in wax compositions for the hot carbon process.

The wall material of the microcapsules is a cross-linked urea-melamine condensate.

The wax compositions may be applied over all or part of the surface of a base material, and give deeply colored copies with color-forming (CF) layers.

9 Claims, No Drawings

MICROCAPSULE-CONTAINING WAX COMPOSITION

The present invention relates to a microcapsule-containing wax composition based on microcapsules in which the wall material is a melamine-formaldehyde condensate, and to the preparation and use of this wax composition.

Microcapsule-containing wax compositions have long been known from the patent literature. Thus, U.S. Pat. Nos. 3,016,308 and 3,079,351 describe microcapsule-containing wax compositions with melting points of from 55° to 175° C. The compositions can be applied to a paper base material by various methods, for example by printing. The solidification of the wax bonds the microcapsules to the base material. The dry microcapsules obtained by spray-drying the emulsions described in the above U.S. patents have diameters of from 1 to 50 μm and are therefore unsuitable for the preparation of pressure-sensitive recording materials. The large capsules are destroyed during printing or coating with a layer of about 5 μm thickness. Some large capsules are also destroyed during preparation of the microcapsule-containing wax composition, as a result of the relatively high temperature and the shearing forces required for homogenization. This destruction results in poor intensity of the copy obtained, and in gradual coloration of the color-forming (CF) layer, ie. the acceptor layer, in contact with the wax composition in the set of forms.

Japanese Published Application No. 73/12,255 describes a microcapsule-containing wax composition for spot printing. The composition is obtained by mixing dry microcapsules with a wax melt in the presence of a non-ionic surfactant. Suitable capsules have wall materials consisting of gelatin, polymers or melamine-formaldehyde condensates. Paper coated with this wax composition allegedly shows no staining when a set of forms is stored.

German Laid-Open Application DOS No. 2,719,914 describes pressure-sensitive, no-carbon copy papers based on microcapsule-containing wax melts. The wax composition used for coating is prepared by warming the water-insoluble waxy substances, bearing functional groups, or the non-polar waxes, with anionic dispersants to above the melting point, and dispersing the dry microcapsules in this melt. According to the statements in the description, suitable wall materials of the microcapsules used in these compositions are based on hydroxypropylcellulose, methylcellulose, carboxymethylcellulose, melamine-formaldehyde, polyfunctional isocyanates and their prepolymers, polyfunctional acid chlorides, polyamines, polyols, epoxides or mixtures thereof. Microcapsules with a wall material consisting of hydroxypropylcellulose crosslinked with polyfunctional isocyanates are particularly preferred.

The wax composition can also be prepared by adding the aqueous microcapsule dispersion to the wax melt and distilling off the water under reduced pressure. In that case, the aqueous capsule dispersion must be introduced continuously into the wax melt at the rate at which the water distills off, so that the mass is virtually free from water. Hydroxypropylcellulose capsules are unstable in the presence of water at 70° C., whilst dry capsules are supposed to be stable for about 18 hours in the absence of water at about 95° C. However, Table I in Example II shows that the microcapsules based on hydroxypropylcellulose crosslinked with polyisocyanate and post-hardened with melamine-formaldehyde and gelatin have considerable permeability in the wax melt at 90° C. and accordingly show a high loss on thermographic analysis.

German Laid-Open Application DOS No. 2,818,976 also describes microcapsule-containing hot-melt wax compositions. The compositions are prepared by the process described in German Laid-Open Application DOS No. 2,719,914, Example 1, namely by adding the aqueous microcapsule dispersion to the wax melt and removing the water under reduced pressure. The dispersion is added at the rate at which the water is removed. To achieve rapid removal of the water, mixing with the wax melt is effected with continuous stirring in a thin film evaporator.

In the case of German Laid-Open Application DOS No. 2,818,976, possible suspending media (waxes) also include water-soluble waxes and resins, such as polyethylene oxide wax and polyvinylpyrrolidone. The no-carbon copy papers obtained with the wax compositions thus produced give poorer copies than do corresponding papers using wax compositions which have been prepared with spray-dried microcapsules.

Since the coating compositions of German Laid-Open Applications DOS Nos. 2,818,976 and 2,719,914 are more or less lightly colored, it means that if white paper is used its coated side is correspondingly colored. Since dulling agents such as titanium dioxide or clay form lumps in the wax melt and are difficult to disperse, it was not possible to use this approach to mask the color of the wax coating. In German Laid-Open Application DOS No. 2,820,600, this problem is solved by adding an inorganic pigment to the aqueous microcapsule dispersion and isolating this mixture by spray-drying. This gives a pourable powder which is subsequently dispersed in the wax melt.

Further, German Laid-Open Application DOS No. 2,826,939 discloses microcapsules with secondary capsule walls, in which the capsule wall first formed from hydroxypropylcellulose and a diisocyanate or polyisocyanate is after-treated with phenol and aldehyde in a subsequent stage. In this process, the polymer formed by condensation deposits on the wall first formed. Such capsules are supposed to have advantages for the preparation of microcapsule-containing wax compositions, since the capsules can be separated from the aqueous phase by filtration, and be introduced, in this form, into conventional wax melts. However, only Example 2 describes a coating composition. According to Example 3, the particle sizes of the capsules are from 3.1 to more than 12.3 μm (25% being larger than the latter figure), and the capsules are present as agglomerates.

If follows from the prior art that up to now it has not proved possible to prepare sufficiently stable microcapsule-containing hot-melt wax composition.

It is an object of the present invention to provide a stable microcapsule-containing wax composition for hot-melt application.

We have found that this object is achieved and that a wax composition which is exceptionally suitable for the above purpose and does not suffer from the disadvantages known from the prior art is obtained if the composition contains—based on (a+b+c):

(a) from 20 to 55% by weight of microcapsules, (b) from 79 to 30% by weight of wax or of a mixture of different waxes, of melting point from about 50° to 140° C., (c) from 1 to 10% by weight of at least one non-ionic emulsifier, at least one alkali metal salt of a montan wax acid or a mixture of (α) at least one non-ionic emulsifier and (β) at least one alkali metal salt of a montan wax acid or alkali metal $C_{10}$–$C_{20}$-fatty alcohol-sulfate and/or alkali metal $C_{10}$–$C_{20}$-alkane-sulfonate, (d) from 0 to 20% by weight of pigments and/or fillers and (e) from 0 to 60% by weight of volatile constituents, with or without (f) other agents conventionally present in such wax compositions, the wall material of the microcapsules (a) being a polymeric melamine-formaldehyde condensate which is obtained by condensing melamine with formaldehyde or condensing methylolmelamines and/or their methyl ethers, using a ratio of melamine to formaldehyde of from 1:2 to 1:6, at a pH of from 3.5 to 5.5 and at from 60° to 100° C., and then hardening for from 2 to 10 hours at from 60° to 100° C., the ratio of core material to wall material in the capsules being from 1:15 to 1:2 and the microcapsules having a diameter of from 2 to 10 μm.

Essential features of the invention are that the wax composition contains microcapsules whose wall material (1) consists of a melamine-formaldehyde condensate and (2) has been prepared under the conditions described above.

The novel wax compositions are heat-stable even in the presence of water and, after application to a base material, give deeply colored sharp copies when used in conjunction with CF layers. The CF layers do not discolor even when sets of forms are stored for lengthy periods. Furthermore, there is no discoloration, or virtually no discoloration, if the microcapsule-containing wax composition is applied direct onto the CF layer. The wax compositions according to the present invention can be applied, by conventional methods, over all or part of the surface of the base material, simultaneously with, or after, printing of the latter. Clean, smooth, undistorted base materials are obtained even if the wax composition contains up to 20% by weight of water, based on (a+b+c).

The walls of the microcapsules present in the novel wax compositions consist of highly crosslinked melamine-formaldehyde condensate. The ratio of wall material to core material is from 1:15 to 1:2, preferably from 1:10 to 1:4. The most advantageous ratio depends on the capsule size: the larger the capsule, the more wall material is required. The microcapsules required for the novel wax compositions are obtained by hardening the capsules first obtained. This hardening is effected by heating the aqueous capsule dispersion at 60°–100° C., preferably 70°–90° C., for from 2 to 10, preferably from 3 to 6, hours. This treatment increases the heat stability and stability to water in the wax melt. The treatment results in an increase in the formaldehyde content of the aqueous phase. The formaldehyde formed can be bound with ammonia, amines or other compounds which react with formaldehyde, eg. ethyleneurea.

The primary walls of the capsules are formed by condensing melamine with formaldehyde, or methylolmelamines, or methylolmelamine methyl ethers, or mixtures of these, using a ratio of melamine to formaldehyde of from 1:2 to 1:6, preferably from 1:3 to 1:6.

Wax compositions containing microcapsules with diameters of from 2 to 10 μm, especially from 2 to 8 μm, are suitable for the envisaged use of the wax composition.

The preparation of the primary microcapsules is known. The subsequent hardening may be carried out with any microcapsules obtainable by conventional methods and having walls consisting of melamine-formaldehyde condensates, provided these conform to the above criteria. Microcapsules obtained by the process of Published European Patent Application No. 26,914 are preferred.

The novel wax compositions contain from 20 to 55, preferably from 30 to 45, % by weight, based on (a+b+c), of the microcapsules (a). The higher the content of (a) in the wax composition, the deeper, as a rule, are the copies obtained. On the other hand, an increasing proportion of wax (b) and pigment (d) protects the capsules from destruction. Since an increase in content of (a) also increases the viscosity of the liquid wax composition, preferred waxes for compositions having a high content of (a) are those which give melts of low viscosity. We have found that small amounts, for example from 2 to 10% by weight, of water in the melt lower the viscosity of the latter without adversely affecting the use of the composition or the base material, such as paper, coated with the composition.

Suitable waxes are, in particular, the water-insoluble waxes conventionally used in wax compositions for the hot carbon process, these waxes being used individually or as a mixture of different waxes, having a melting point of from about 50° to 140° C. Pale waxes are preferred for the compositions according to the invention. Natural or synthetic waxes may be used, specific examples being vegetable waxes, such as candelilla wax and carnauba wax, hydrocarbon waxes, eg. paraffins, ozokerite and microcrystalline waxes, montan wax and waxes prepared therefrom, such as montan acids and their esters, polyethylene waxes, oxidized microcrystalline waxes and ester waxes.

The mixtures can additionally contain hydrophilic waxes, such as polyethylene glycols, polypropylene glycols or ethylene oxide/propylene oxide block copolymers.

The depth of color of the copy depends on the wax mixture used as the binder, and in particular not only on the hardness but also on the wettability of this mixture. With paraffins, the depth of the copy improves with increasing melting point of the paraffins (for example with an increase from 52° to 69° C.). With ester waxes, based on ethylene glycol or butanediol, and montan acids as binders, deeper copies are obtained than with paraffins and/or montan acids. The depth of the copy can also be improved by adding ethylene oxide adducts.

In order that the microcapsules should disperse homogeneously in the wax melt, without a substantial proportion of agglomerates, the melt contains, as (c), from 1 to 10% by weight, based on (a+b+c), of one or more non-ionic emulsifiers, or at least one alkali metal salt of a montan wax acid, or a mixture of (α) at least one non-ionic emulsifier and (β) at least one alkali metal salt of a montan wax acid, of an alkali metal $C_{10}$–$C_{20}$-fatty alcohol sulfate or of an alkali metal $C_{10}$–$C_{20}$-alkanesulfonate.

Particularly suitable non-ionic emulsifiers to be used as (c) are water-soluble adducts of from 13 to 30, preferably from 15 to 25, moles of ethylene oxide with one mole of $C_{12}$–$C_{20}$-alkanol or $C_{12}$–$C_{20}$-alkenol. In many cases it is advantageous to replace up to 50% of the water-soluble emulsifier by an oil-soluble adduct of from 3 to 10, preferably from 4 to 8, moles of ethylene oxide with one mole of a mono-, di- or tri-alkylphenol, or of a $C_{12}$–$C_{20}$-alkanol or $C_{12}$–$C_{20}$-alkenol.

Further suitable components (c) are alkali metal salts of montan wax acids and mixtures of (α) a non-ionic emulsifier and (β) an alkali metal salt of a montan wax acid, or an alkali metal $C_{10}$–$C_{20}$-fatty alcohol-sulfate and/or an alkali metal $C_{10}$–$C_{20}$-alkanesulfonate.

Examples of the suitable fatty alcohol-sulfates, ie. of salts of sulfuric acid half-esters of fatty alcohols, are those derived from decanol, lauryl alcohol (dodecan-1-ol), tetradecan-1-ol, hexadecan-1-ol (palmityl alcohol), octadecan-1-ol (stearyl alcohol) or technical $C_{10/12}$-, $C_{12/14}$- or $C_{14/18}$-alkanol mixtures.

Suitable $C_{10}$–$C_{20}$-alkanesulfonates are the alkali metal salts of, for example, decanesulfonic acid, dodecanesulfonic acid, tridecanesulfonic acid, tetradecanesulfonic acid, hexadecanesulfonic acid or octadecanesulfonic acid, or of mixed $C_{10/12}$-alkanesulfonic acids or $C_{12/16}$-alkanesulfonic acids.

Suitable alkali metals are, in particular, the sodium, potassium and lithium salts, amongst which the first two are preferred.

The alkali metal salts of montan wax acids are obtained by neutralizing the acids, produced by chromic acid oxidation of montan wax, with the appropriate bicarbonates, carbonates or hydroxides. The alkali metal salts of the montan wax acids can be prepared separately or as a first stage in the wax melt to be used.

Amongst the water-soluble emulsifiers (c), adducts of from 15 to 25 moles of ethylene oxide with one mole of stearyl alcohol, tallow alcohol or a partially unsaturated $C_{16/18}$-alkanol mixture are particularly preferred.

Alkali metal salts of montan wax acids, and mixtures of (α) non-ionic emulsifiers, especially those mentioned above, and (β) alkali metal salts of montan wax acids, alkali metal $C_{10}$–$C_{20}$-fatty alcohol-sulfates and/or alkali metal $C_{10}$–$C_{20}$-alkanesulfonates are particularly preferred as component (c).

Amongst these, the alkali metal salts of montan wax acids and mixtures of these alkali metal salts with adducts of from 15 to 25 moles of ethylene oxide and one mole of stearyl alcohol, tallow alcohol and/or a mixture of partially unsaturated $C_{16/18}$-alkanols are more especially preferred, because of their particularly good dispersing action.

If a sufficient amount of (c) is used, the microcapsules in the wax are substantially or almost completely in the form of individual particles. The amount of (c) required for this purpose is from 1 to 10, preferably from 3 to 10, especially from 4 to 9, % by weight, based on (a+b+c).

To improve the stability of the microcapsules in the wax coating, opaque pigments, fillers or mixtures of these, such as are also used in microcapsule-containing aqueous paper-coating compositions, can be added to the wax composition. These additives are intended to prevent premature unintentional destruction of capsules, for example when sheets rub against one another. Examples of suitable pigments are titanium dioxide, barium sulfate and blanc fixe, and examples of suitable fillers are starch or protein in the form of fine granules, or spherical particles of urea-formaldehyde condensates, with diameters of from 2 to 20 μm.

Because of the high stability of the microcapsules to heat, even in the presence of water, the wax melt can contain up to 60, preferably from 0 to 20, % by weight, based on (a+b+c), of water as the volatile component (e). The water component has an advantageous effect on the viscosity of the wax composition, in that it reduces the latter, and on the dispersion of microcapsule agglomerates when the microcapsules are being introduced.

The other constituents (f) conventionally present in hot-melt wax compositions include viscosity regulators. Thus, the viscosity of the composition can be increased by adding polyethylene wax or oxidized polyethylene, or be lowered by adding petroleum jelly, mineral oil, stearylamide, stearic acid esters, sodium stearate, potassium stearate, barium stearate, sodium palmitate, potassium palmitate, sodium oleate, potassium oleate, calcium stearate, zinc stearate, A-wax, polymers which are soluble in the melt, or mixtures of these constituents.

The novel wax compositions can be prepared by various methods.

(1) The capsules are isolated from the aqueous dispersion, for example by creaming and filtration or by centrifuging. The moist capsules obtained, which contain about 40% of water, are introduced into the emulsifier-containing wax melt. The water introduced can be removed, if desired, for example by distillation under reduced pressure, but can also be left in the wax composition. The microcapsules are present in the composition in the form of individual capsules.

(2) The capsules are precipitated or flocculated in the dispersion, for example by adding salts, especially salts with a polyvalent cation, or by adding long-chain amines, such as stearylamine, diethylhexylamine, dimethyl-$C_{13}$–$C_{15}$-alkylamine or 2-ethylhexylamine, preferably at pH 7.0. The flocculated capsules are isolated, for example by centrifuging, and are incorporated into the wax melt as described in (1).

(3.1) The microcapsules are isolated from the dispersion by spray-drying. The powder obtained consists predominantly of agglomerated microcapsules and is therefore more difficult to disperse in the wax melt than are the moist microcapsules isolated as described in (1) or (2).

Dispersing the dry capsules can be made substantially easier by adding a small amount of water to the wax melt.

Preferably, the microcapsules which have been isolated by spray-drying are dispersed in the wax melt in the presence of alkali metal salts of montan wax acids or of mixtures of (α) non-ionic emulsifiers and (β) alkali metal salts of montan wax acids, alkali metal $C_{10}$–$C_{12}$-fatty alcohol-sulfonates and/or alkali metal $C_{10}$–$C_{12}$-alkanesulfonates as the dispersant (c), and in the presence of from 1 to 15, preferably from 5 to 15, % by weight, based on (a+b+c), of water as component (e).

Particularly preferred components (c) for this preparation of microcapsule-containing wax compositions are alkali metal salts of montan wax acids and mixtures of adducts of from 15 to 25 moles of ethylene oxide with one mole of stearyl alcohol, tallow alcohol and/or a partially unsaturated $C_{16}/C_{18}$-alkanol mixture with alkali metal salts of montan wax acids.

The amount of water is here again from 1 to 15, preferably from 5 to 15, % by weight, based on (a+b+c).

This method gives wax compositions which are virtually free from microcapsule agglomerates.

(3.2) The method of isolation of the microcapsules by spray-drying can also be modified:

(3.2.1) An example of a method which can be advantageous is replacing the aqueous phase, containing the protective colloid, by water, by centrifuging off the capsules, stirring them into water which may or may not contain a low molecular weight emulsifier, centrifuging the mixture again and repeating this procedure up to 3 times more.

(3.2.2) Alternatively, it is possible to add to the capsule dispersion the subsequently required amounts of spacers (d) and/or emulsifiers (c) and then to isolate the capsules by spray-drying. The powder obtained is then incorporated into the wax melt. The capsules obtained by methods 3.2.1 and 3.2.2 are again more difficult to disperse in the wax melt than are the microcapsules isolated by method (1) or (2). However, the above method 3.1 gives fully satisfactory, virtually agglomerate-free, microcapsule-containing wax compositions.

(3.2.3) The dispersion of the dry microcapsules in the wax can be improved, if a non-ionic emulsifier is used as (c), by adding long-chain fatty amines to the aqueous microcapsule dispersion at 50°-100° C. before spray-drying.

(3.2.4) In a further embodiment, wax in the form of a dispersion is added, with or without non-ionic emulsifiers, to the microcapsule dispersion before spray drying. In that case from 15 to 70, preferably from 25 to 50, % by weight—based on microcapsules—of solid wax, in the form of a dispersion, and from 0 to 10% by weight of one or more of the components (c), preferably non-ionic emulsifiers, are added to the microcapsule dispersion. The resulting dispersions, when spray-dried, give an easily pourable powder which is easily dispersible in the wax melt. The capsules are essentially present as individual capsules. The wax dispersion added must be very fine, with wax particles which are advantageously not more than 10 μm, preferably not more than 2 μm, in size.

(4) The emulsifier is added to a wax melt, the aqueous microcapsule dispersion is then added as a single shot, and the water is distilled off under atmospheric pressure or, preferably, under reduced pressure, with stirring, at above the melting point of the wax. Advantageously, an inert gas is passed through the apparatus at the same time. It is necessary to ensure that the wax composition remains liquid, since otherwise a mixture containing a high proportion of agglomerated microcapsules results.

(5) The microcapsule dispersion is concentrated, whilst being mixed, until a pasty residue remains. This step can be carried out under atmospheric pressure, reduced pressure or superatmospheric pressure, with or without passing air or an inert gas over the dispersion. Dispersant (c) and water-soluble waxes, with or without low-melting or liquid components required to adjust the viscosity of the wax melt (for example white petroleum jelly or mineral oil), are added before continuing to remove water.

In this way, the water can be removed substantially, or virtually completely, keeping the temperature below 120° C. This method allows the water to be removed more rapidly than by the method in which the microcapsule dispersion is added to the wax melt and the water removed from the melt. Foam resulting from the presence of (c) can easily be destroyed by anti-foam agents which may, for example, be silicone-based. A melt of wax and the remaining components required can then be added immediately to the viscous dispersion obtained, and stirring produces a homogeneous melt containing the microcapsules in dispersed form. However, an alternative procedure is to introduce the components successively and homogenize the melt by mixing it. In that case, the solid, non-fusible components, for example pigments and spacers, should be added last.

Provided the stated measures are employed, the various methods give very homogeneous melts, exceptionally suitable for producing pressure-sensitive no-carbon copying papers. The melts obtained by methods (1) to (5) contain the microcapsules substantially as individual capsules, with some agglomerates. In most cases, the proportion of agglomerates is lowest if some water is present in the melt from the start.

For the industrial preparation of microcapsule-containing wax compositions, method (3.1) is preferred, since this is a simple way of obtaining virtually agglomerate-free compositions.

The depth of color of the copy obtained with the reactive copying papers containing a wax binder is generally somewhat less than in the case of copying papers coated with aqueous microcapsule-containing dispersions. This is true where the microcapsule-containing wax composition is on the surface of the paper (i.e. virtually no wax has as yet penetrated into the paper). If coating is carried out under conditions which allow the wax to penetrate into the paper, the product obtained gives a deeper copy.

The last-mentioned method has proved particularly suitable for the production of copying papers for sets of forms, in which, after the forms have been filled in, the loose sheet (copy-making paper) bearing the microcapsules containing the color-formers is removed. This loose sheet is clean, contrary to the conventional carbon copy papers. Using the copy paper coated with the novel wax composition, clean copies are obtained, on which, after removal of the loose sheet, no unintentional marks result on subsequent handling.

The Examples which follow, in which parts and percentages are by weight, illustrate the invention. Parts by volume bear the same relation to parts by weight as that of the liter to the kilogram.

I. PREPARATION OF THE MICROCAPSULE DISPERSION

I.1 Microcapsule dispersions 1 to 4

968 parts of water and 160 parts of a 20% strength solution of sodium poly-2-acrylamido-2-methyl-propanesulfonate (viscosity 880 mPa.s) are mixed in a cylindrical stirred vessel fitted with a disperser (® Turrax from Jahnke and Kunkel). 800 parts of a solution of 9.3 parts of 3'-phenyl-7-N-dimethylspirodibenzopyran, 22.65 parts of 2,6-diphenyl-4-(4'-dimethylaminophenyl)-pyridine, B 9.35 parts of 3-dibutylamino-5-diethylamino-2,4-diazarhodaminolactone, 6.13 parts of N-benzoyl-leucomethylene blue and 0.40 part of crystal violet lactone in 752.2 parts of dodecylbenzene are then dispersed in the aqueous solution at the maximum speed of revolution of the stirrer. A solution, brought to pH 4.0, of 120 parts of a partially methylated precondensate of melamine and formaldehyde in the molar ratio of 1:5.25 (which precondensate contains about 2.3 $CH_3O$ groups per melamine molecule and gives a clear solution in water) in 132 parts of water is then added uniformly to the emulsion in the course of 3 hours at 40° C., whilst the pH is kept constant at 4.0. After about 1.5 hours, capsule formation is discernible in a sample under the microscope; the emulsion droplets no longer coalesce on the microscope slide. After 3 h 10 min, the disperser is switched off and the microcapsule dispersion formed is post-hardened at the temperatures and for the times shown in the Table, whilst being stirred with a propeller stirrer. The capsule dispersion is then cooled and brought to a pH of from 8 to 9 with ammonia, after which it is sieved through a 40 μm mesh sieve.

TABLE 1

| Microcapsule dispersion | Hardening Temp. (°C.) | pH | Time (h) |
|---|---|---|---|
| 1 | 40 | 4.0 | 8 |
| 2 | 51 | 4.0 | 6 |
| 3 | 70 | 4.0 | 5 |
| 4 | 95 | 4.0 | 5 |

The dispersions obtained are colorless and milky, and according to measurements in a TF Coulter Counter contain individual capsules, the peak of the particle size distribution being at 5.6 μm. The solids content of the dispersions is 40.0%.

I.2 Microcapsule dispersion 5

The dispersion is prepared as described under I.1, except that a solution of 180 parts of the melamine-formaldehyde precondensate in 200 parts of water (pH=4.0) is added in the course of 4 h. The 40% strength dispersion is post-hardened for 2 h at 95° C. and pH 4.0. The dispersion contains individual capsules, the peak of the particle size distribution being at 3.4 μm (measured in a TF Coulter Counter).

I.3 Microcapsule dispersion 6

The dispersion is prepared as described in I.1, except that the post-hardening is carried out at pH 4.1 and 70° C., for 5 h. Solids content: 40%; peak of the microcapsule size distribution: 5.7 μm.

I.4 Microcapsule dispersion 7

The dispersion is prepared as described in I.1, except that a solution of 180 parts of a partially methylated precondensate of melamine and formaldehyde in the molar ratio of 1:6 (the precondensate containing about 5 $OCH_3$ groups per melamine molecule, and giving a clear solution in water) in 200 parts of water is added in the course of 4.5 h. Post-hardening is carried out at pH 4.0 and 70° C., for 5 h. Solids content: 38.9%; peak of the capsule size distribution: 5.4 μm.

I.5 Microcapsule dispersion 8

The dispersion is prepared as described in I.4, except that the same amount of a partially methylated melamine-formaldehyde precondensate in the molar ratio of 1:5.7, containing 2.3 $CH_3O$ groups per melamine molecule, is used. Solids content: 38.4%; peak of the capsule size distribution: 5.9 μm.

II. TESTING THE WAX COMPOSITION

The wax compositions obtained were tested as follows.

(a) Dispersion of the microcapsules

A drop of the wax melt containing microcapsules is smeared onto a hot microscope slide and examined under the microscope.

(b) Coloration of CF layers (b1) Coloration by color-former contained in the wax composition, due to destruction of microcapsules during preparation of the wax composition.

About 1 ml of the melt is poured onto the active side of a CF sheet. The resulting batch is referred to as the "patch". The melt is then rapidly spread by means of a card, so that a thin coating (hereafter referred to as the "layer"), which does not strike into the paper, is produced. After 24 hours' storage, the coloration of both the patch and the layer is assessed, using ratings of 1 to 5, which denote:

1=colorless
2=slight coloration
3=distinct coloration
4=colored
5=deep coloration.

(b2) Coloration produced when making copies

The coated paper obtained as described in (b1) is placed with its coated face on CF paper, and copies are prepared with this set. The copies are given ratings from 1 to 5, which denote:

1=very deep copy
2=deep copy
3=easily legible copy
4=just legible copy
5=illegible copy (c) Viscosity of the wax melt The viscosity was determined in a ®Rotovisko from Gebr. Haake, Berlin, with ribbed measuring cylinder and cup, at a shearing rate of 428 $sec^{-1}$, at 85° C. and 95° C.

(d) Determination of the solids content

About 1 g of wax melt was weighed out and dried for 5 h at 105° C.

III. WORKING EXAMPLES

Examples 1 to 4

Preparation of the microcapsule-containing wax composition 80 parts of a paraffin of melting point 52°-54° C., and 40 parts of an ester wax prepared from montan acid and butane-1,4-diol (melting point 80°-83° C.; melting point of the mixture 71°-78° C.) are melted together at 95° C. in a heated stirred vessel equipped with an anchor stirrer and distillation attachment. 27 parts of petroleum jelly and 21.5 parts of an adduct of 23 moles of ethylene oxide with one mole of partially unsaturated $C_{16}$-$C_{18}$-alcohol mixture are then added, and when this has dissolved 280 parts of the capsule dispersion shown below are added as a single shot. A homogeneous dispersion results, from which all the water is distilled slowly (in the course of 3 h) at a receiver temperature of 90°-95° C., under reduced pressure (ultimately 200 mm Hg). Thereafter, air is admitted into the vessel and the melt is poured into a foil dish to solidify.

The following microcapsule dispersions are used:

| Example | Microcapsule dispersion |
|---|---|
| 1 | 1 |
| 2 | 2 |
| 3 | 3 |
| 4 | 4 |

The wax compositions obtained are tested as described in II.

(a) The microcapsules are present in the wax compositions substantially as individual capsules.

(c) The viscosity of the melt is about 180-190 mPa.s at 85° C. and 160-170 mPa.s at 95° C.

(d) The solids content is 92-93%.

The results of the test described in II(b) are summarized in Table 1.

TABLE 1

| | Test Results | | | |
|---|---|---|---|---|
| | Micro-capsule | Coloration of CF paper | | |
| Example | dispersion | Patch | Layer | Copy |
| 1 | 1 | 4 | 5 | 3-4 |
| 2 | 2 | 5 | 5 | 3 |
| 3 | 3 | 1 | 1-2 | 3 |
| 4 | 4 | 1 | 1 | 2-3 |

The test results show that for the preparation of wax compositions by the method of Examples 1 to 4, only those microcapsule dispersions, prepared at pH 4, are suitable which have been subjected to hardening of the capsules at 70° C. or above. The assessment of the staining of the CF paper in the batch corresponding to the patch is more significant than the staining of the layer, since spreading the patch with a card itself often destroys some capsules, as is discernible from colored streaks running in the spreading direction.

Example 5

(5.1) Microcapsule-containing wax composition

The microcapsule dispersion 3 (prepared as described in I.1) is dried in a spray drier (gas entry temperature 120° C.) to give a free-flowing powder, having a residual moisture content of 4%. 112 parts of the powder are introduced into the melt of paraffin, ester wax, petroleum jelly and oxyethylation product described in Example 1, and the mixture is stirred for 1 h at 90° C.

Testing the wax composition thus obtained gives the following results:

(IIa) the homogeneous melt contains somewhat more agglomerates than do the melts from Examples 1 to 4.

(IIb1) There is no coloration of the CF layer. Both the patch and the layer are rated 1.

(IIc) Viscosity 350 mPa.s (85° C.)

260 mPa.s (95° C.)

An equally good result is obtained if the microcapsule dispersion 3 is spray-dried by the following methods:

(5.2) 29%, based on solids content, of a spherical-particled, water-insoluble starch is added, as a spacer, to dispersion 3. 93 parts of the dried material (3% residual moisture content) are introduced into the wax melt.

(5.3) 80% of the ethylene oxide adduct contained in wax melt (5.1) (=16%, based on microcapsules) are mixed into dispersion 3, and the latter is then dried. 93 parts of the dried material (15% residual moisture content) are introduced into the wax melt.

(5.4) Before drying dispersion 3, the amount of starch mentioned in (5.2), and the entire amount of the ethylene oxide adduct which would otherwise be present in the wax melt (=20%, based on microcapsules) are added to the dispersion. 117 parts of the dried product (11% residual moisture content) are introduced into the wax melt.

The wax compositions obtained by methods (5.2), (5.3) and (5.4) do not color CF paper when tested as described in II.(b1).

Testing the resulting waxes as described in II.(b2), II.(c) and II.(d) gives the following results:

| | Copy Rating | Viscosity 85° C. [mPa.s] | Viscosity 95° C. [mPa.s] | Solids content [%] |
|---|---|---|---|---|
| Wax (5.1) | 4 | 350 | 260 | 98.7 |
| Wax (5.2) | 3 | 90 | | 98.7 |
| Wax (5.3) | 2-3 | 87 | | 98.4 |
| Wax (5.4) | 4 | 179 | 130 | 98.7 |

Example 6

(6.1) The microcapsule dispersion 5 is centrifuged for ½ hour at 600 g. This causes the microcapsules to settle out on the surface, from where they can be removed as a solid cake (39% moisture content).

(6.2) 184 parts of the moist cake obtained as described in (6.1) are added, with stirring, to a melt, at 90° C., of 80 parts of paraffin (melting point 52°-54° C.), 40 parts of the ester wax mentioned in Example 1, 27 parts of white petroleum jelly and 21.5 parts of the ethylene oxide adduct mentioned in Example 1, which melt contains 22.4 parts of a free-flowing granular urea-formaldehyde condensate (in which the particles have diameters of about 1 μm and form agglomerates with diameters of up to 12 μm). After 30 minutes, a homogeneous melt has been obtained, which contains 17.8% of water, through this water is not visually perceptible.

(6.3) When tested by method II.(b1), the CF layer shows no discoloration. Moreover, the paper does not ruckle, in spite of the water content of the melt.

CB coatings prepared with this wax composition give easily legible copies, rated 3 by the method of II.(b2).

If, on the other hand, microcapsule dispersion 2 is used instead of dispersion 5, the wax composition (6.4% residual moisture content) obtained, when tested by method II.(b1), gives a strong greenish grey coloration, rated 4, of both the patch and the layer portions of the coating. The copies obtained with this wax composition are however still very legible, being rated 3-4. Viscosity (measured by method IIc) 186 mPa.s at 95° C.

Example 7

28.8 parts of paraffin (melting point 52°-54° C.), 14.4 parts of the ester wax described in Example 1, 4.9 parts of white petroleum jelly and 4.8 parts of the ethylene oxide adduct from Example 1 are melted at 80° C., in the apparatus described in Example 1. At the same temperature, 62 parts of microcapsule dispersion 6 are added to the homogeneous melt, with stirring, and 35 parts of water are then distilled off, under slowly decreasing pressure, at a melt temperature of from 82° to 73° C. The melt must not be allowed to drop locally below the solidification point, due to excessively rapid evaporation of water, since solidification may result in agglomerates which can no longer be dispersed. The wax composition obtained has a viscosity of 139 mPa.s at 85° C. and 131 mPa.s at 95° C. The solids content, determined by method II(d), is 98.2%.

A smear on a heated microscope slide shows predominantly individual capsules, together with a few agglomerates. Test II(b) gives the following results:

II(b.1)

Rating 1 in the patch

Rating 1-2 in the layer (barely perceptible grey streaks)

II(b.2)

Rating 3–4 (amount applied: 5 g of wax composition/m²)

Example 8

39.1 parts of microcapsule dispersion 7 are mixed with 2.2 parts of the ethylene oxide adduct from Example 1 and 5.95 parts of white petroleum jelly by stirring at 90° C., and 15.3 parts of water are distilled from this mixture under reduced pressure. To prevent foaming, a small amount of a silicone-based anti-foam agent is added.

A melt, at 90° C., of 17.6 parts of paraffin (melting point 52°–54° C.), 8.8 parts of the ester wax described in Example 1 and 1.5 parts of the ethylene oxide adduct mentioned above is then added to the liquid mixture. The wax melt is dispersed immediately; the mixture is stirred for a further 1.5 h at 88° C. and is then drained off. Solids content 84.4%. Viscosity of the melt 547 mPa.s at 85° C., 485 mPa.s at 95° C.

In a test by method II.(b1), no coloration is found in either the patch or the layer. Rating: 1.

A copy, tested by method II.(b2), gives a rating of 2–3 (coating weight: 6.5 g/m²).

Example 9

64 parts of microcapsule dispersion 8 are mixed with 3.23 parts of the ethylene oxide adduct from Example 1 and 5.95 parts of white petroleum jelly at 80° C., and 33.2 parts of water are distilled from this mixture under reduced pressure in the course of 4 h, the mixture being at 50°–80° C. The residue is heated to 80° C. and a melt, at 90° C., of 17.6 parts of paraffin (melting point 52°–54° C.), 8.8 parts of the ester wax mentioned in Example 1 and 1.5 parts of the ethylene oxide adduct mentioned above is added. The mixture is then dispersed for 2.5 h at 90° C. Viscosity of the composition at 120 mPa.s at 85° C. Solids content 93.1%.

A sample, melted on a microscope slide and spread thereon, shows predominantly individual capsules when viewed under the microscope. Testing by methods II.(b1) and II.(2) gives the following results:

II(b1) Rating 1; no staining discernible in either the patch or the layer.

II(b2) Rating 1; very easily legible, sharp copy.

Example 10

86.6 parts of capsule dispersion 8, 6.4 parts of the emulsifier of Example 1 and 0.005 part of a silicone anti-foam agent are introduced into a kettle, having a capacity of 150 parts by volume and fitted with a propeller stirrer, and are warmed to 90° C.; 37.9 parts of water are then removed under reduced pressure in the course of 3 hours. A hot melt of 9.8 parts of paraffin (melting point 69°–73° C.) and 19.6 parts of the ester wax of Example 1 is then run, with stirring, into the initial batch, which is at 90° C. The melt is dispersed immediately. The kettle is closed and dispersing is continued for 2 hours, under reduced pressure, whilst distilling off a further 3.3 parts of water. A homogeneous melt, containing 50% of capsules, based on solids, is obtained. The solids content of the melt is 82.0%. Viscosity 505 mPa.s at 85° C., 530 mPa.s at 95° C. The melt contains individual capsules.

A test by method II(b1) gives a rating of 1, with no staining in either the patch or the layer. A test of a copy by method II.(b2) gives a rating of 1–2, the coating weight being 5.3 g/m².

Example 11

552 parts of microcapsule dispersion 8 (from Example I.5) are mixed with 43 parts of an adduct of 23 moles of ethylene oxide with one mole of a partially unsaturated $C_{16}$–$C_{18}$-alcohol mixture, and 208 parts of water are stripped from the mixture in 3.5 h at 90° C., under reduced pressure. A melt of 98 parts of paraffin (melting point 69°–73° C.) and 196 parts of the ester wax from Example 1 is then added slowly and stirring is continued under reduced pressure at 90° C. for 3 h, during which a further 107 parts of water distill. 46 parts of a spherical-particled starch (special starch K from Amylum) are then slowly introduced into the melt, and the mixture is homogenized for 1 hour. A mobile melt, of viscosity 319 mPa.s at 85° C. and 226 mPa.s at 95° C., results; solids content 92.2%.

When the wax composition is tested by method II.(b1), the rating is 1, and no staining is observed in either the patch or the layer; a copy, tested by method II.(b2), gives a rating of 1–2 (the coating weight being 5.5 g/m²).

If the coated paper obtained by method II.(b1) is heated for 2 h at 120° C. in a drying oven, there is no staining by developed color-former, but there is staining by the wax which has penetrated into the paper. The paper treated in this way gives exceptionally deep copies, rated 1, when tested by method II.(b2). This paper can be used, for example, as copy paper.

Example 12

(a) 560 parts of microcapsule dispersion 8, 23 parts of the emulsifier from Example 11 and 5 drops of a silicone anti-foam agent are mixed and stirred at 89° C. under reduced pressure for 1.5 h, during which time 219 parts of water distill off. A melt of 196 parts of montan wax (melting point 80°–83° C.), 98 parts of paraffin (melting point 69°–73° C.) and 20 parts of the emulsifier from Example 11 is added at 90° C., with efficient stirring, and the resulting mixture is homogenized by stirring under reduced pressure for 5 h, during which a further 65 parts of water pass over. A homogeneous, smooth melt, containing individual capsules, is obtained. Solids content 85.1%. Viscosity 412 mPa.s at 85° C., 324 mPa.s at 95° C.

A test by method II.(b1) gives a rating of 1, with no coloration discernible either in the patch or in the layer.

Testing the depth of the copy by method II.(b2) gives a rating of 3, the coating weight being 4.8 g/m².

If the coated paper is stored for 2 h at 120° C., a wax-impregnated paper results, which gives copies rated 1–2.

(b) If, in (a), the 196 parts of montan wax are replaced by an equal amount of a bleached montan acid esterified with ethylene glycol (melting point 77°–80° C.), a homogeneous melt containing individual capsules is obtained. Solids content 89.5%. Viscosity 251 mPa.s at 85° C., 307 mPa.s at 95° C.

Testing this composition by method II.(b1) gives a rating of 1, with no staining discernible in either the patch or the layer.

Testing the depth of the copy by method II.(b2) gives a rating of 2, the coating weight being 5.8 g/m². If the coated paper is stored for 2 h at 105° C., a wax-impregnated paper is obtained, which gives very deep copies, rated 1.

Example 13

(a) 801 parts of microcapsule dispersion 8 and 308 parts of an aqueous dispersion which contains 16.5% of the ethylene glycol ester of montan acid, 10% of ozokerite and 4.5% of a mixture of 8.5 parts of the emulsifier mentioned in Example 11 with 1.5 parts of an adduct of 1 mole of tributylphenol with 4 moles of ethylene oxide are mixed, and the resulting dispersion is dried in a spray tower with a gas entry temperature of 120° C. and exit temperature of 70° C.

(b) 109 parts of the fine, free-flowing dried material are introduced into a stirred melt of 24 parts of an ester wax of montan acid and butanediol (melting point 80°-83° C.), 13 parts of an adduct of 23 moles of ethylene oxide with one mole of a partially unsaturated $C_{16}$–$C_{18}$-alcohol mixture and 53 parts of paraffin (melting point 52°-54° C.), and stirring is continued for 4 h at 90° C. 15.2 parts of a spherical-particled starch (special starch K from Amylum) are then introduced into the homogeneous melt in the course of 1 hour, and stirring is continued until a homogeneous, smooth melt is again obtained. Solids content 99%. Viscosity 800 mPa.s at 85° C. The melt contains essentially individual capsules.

A test by method II.(b1) gives a rating of 1, with no discoloration discernible in either the patch or the layer.

Since the melt was too viscous for coating, the viscosity of a sample was reduced by adding 10% of petrol, and this mixture was used to test a copy by method II.(b2). The rating was 1-2, with a coating weight of 7.2 g/m$^2$.

Virtually the same result is obtained if the viscosity of the melt is reduced by emulsifying 7% of water therein.

Example 14

(a) 750 parts of microcapsule dispersion 8 are mixed with 385 parts of a dispersion which contains 35% of a montan acid esterified with ethylene glycol and 5% of an adduct of 23 moles of ethylene oxide with one mole of tallow alcohol, and the mixture is spray-dried, the gas entry temperature being 120° C. and the exit temperature 70° C.

The diameter of the wax particles in the wax dispersion is substantially below 1 μm, so that the particles are no longer discernible under an optical microscope.

(b) 152 parts of the free-flowing dried material are introduced, in portions, into a melt, at 95° C., of 53 parts of paraffin (melting point 52°-54° C.) and 4.5 parts of an adduct of 23 moles of ethylene oxide with one mole of a partially unsaturated $C_{16}$–$C_{18}$-alcohol mixture. The mixture is then stirred for 3 h, after which it contains virtually no water. The capsules are non-agglomerated. The viscosity of the mixture at 95° C. is >800 Pa.s.

A test by method II.(b1) gives a rating of 1, with no discoloration in either the patch or the layer.

To test the copy by method II.(b2), the melt was diluted with 10% of petrol. The rating was 1, with a coating weight of 3.7 g/m$^2$.

Example 15

Microcapsule dispersion 3 (prepared as described in I.(1) is spray-dried (gas entry temperature 120° C.) to give a free-flowing powder, having a residual moisture content of 4%.

15.1 90 parts of this powder are slowly introduced into a melt of 72 parts of paraffin (melting point 52°-54° C.), 60 parts of an ester wax of montan acid and ethylene glycol (melting point 78°-80° C.) and 5 parts of the sodium salt of the montan wax acid (acid number 140) in the form of a 26.5% strength aqueous paste, and the mixture is stirred for 3 h at 90° C. A pasty melt is obtained, which still contains numerous capsule agglomerates.

15.2 90 parts of microcapsule powder are introduced, as in 15.1, into a melt of 87 parts of paraffin, 60 parts of the ester wax referred to in 15.1 and 9 parts of the sodium salt of the montan wax acid referred to in 15.1, in the form of a 26.5% strength aqueous paste, and the mixture is homogenized by stirring.

A virtually smooth melt is obtained, which no longer contains any agglomerates. Solids content 93.4%, viscosity 121 mPa.s (85° C.).

A test of the wax composition by method II.(b1) gives a rating of 1 in the patch and of 1-2 in the layer (there being barely perceptible streaks). A test by method II.(b2) gives a rating of 2-3 for the depth of the copy.

15.3 Copies of similar depth are obtained if the wax mixture described in 15.2 is prepared with a sodium salt of a montan wax acid of acid number 120, in the form of a 27.4% strength aqueous paste, in place of the sodium salt of montan wax acid referred to in 15.2, and in other respects the procedure described in 15.1 is followed.

The melt contains individual capsules together with some agglomerates. Solids content 92.8%; viscosity 130 mPa.s at 85° C. and 110 mPa.s at 95° C. A test by method II.(b1) gives a rating of 1 for the patch and of 1-2 for the layer. A test by method II.(b2) gives a rating of 2 for the copy.

Example 16

16.1 The procedure described in Example 15.2 is followed, except that the wax melt additionally contains 1 part of an adduct of 23 moles of ethylene oxide with one mole of a partially unsaturated $C_{16}$–$C_{18}$-alcohol mixture.

16.2 The procedure described in 16.1 is followed, except that 3 parts of the said ethylene oxide adduct are employed.

After 3 h at 90° C., smooth homogeneous melts, which virtually contain individual capsules only, are obtained in both cases.

| Solids content: | | 16.1 | 16.2 |
|---|---|---|---|
| | | 94% | 94.6% |
| Viscosity at 85° C.: | | 194 mPa.s | 158 mPa.s |
| at 95° C.: | | 150 mPa.s | 105 mPa.s |
| Test by method (II.b): | | | |
| (II.b1) | Patch | 1 | 1 |
| | Layer | 1 | 1 |
| (II.b2) | Copy | 2-3 | 2-3 |

In the case of the coating obtained with the wax composition from Example 16.2, a deeper copy (rating 2) is obtained if the coated paper has first been kept for 2 h at 80° C.

Example 17

71 parts of the microcapsule powder obtained according to Example 5.1 are slowly introduced into a melt of 72 parts of paraffin (melting point 52°-54° C.), 60 parts of ester wax (prepared from montan wax acid and ethylene glycol), 22.5 parts of a 40% strength aqueous solution of a sodium $C_{15}$-paraffinsulfonate (≙9 g of solids), 1 part of the ethylene oxide adduct referred to in Example 16.1 and 10 parts of water, and the mixture is homogenized by stirring for 3 h at 90° C. The melt contains virtually only individual capsules. Solids content 92.8%; viscosity 243 mPa.s at 85° C. and 150 mPa.s at 95° C.

Test by method II.(b1) patch: 1; layer: 1.

Test by method II.(b2) copy: 3.

Example 18

71 parts of microcapsule powder obtained according to Example 15, para 1, are slowly introduced into a melt of 72 parts of paraffin (melting point 52°-54° C.), 60 parts of ester wax (obtained from montan wax acid and ethylene glycol; melting point 78°-80° C.), 32 parts of a 28.4% strength aqueous solution of sodium laurylsulfate (≅9 parts of solids) and 3 parts of the ethylene oxide adduct referred to in Example 16.1, and the mixture is homogenized by stirring for 3 h at 90° C. The melt obtained substantially contains only individual capsules. Solids content 93.1%; viscosity 307 mPa.s at 85° C. and 258 mPa.s at 95° C.

Test by method II.(1) patch: 1; layer: 1.

Test by method II.(2) copy: 2-3.

We claim:

1. A microcapsule-containing wax composition which contains—based on (a+b+c):

(a) from 20 to 55% by weight of microcapsules, (b) from 79 to 30% by weight of wax or of a mixture of different waxes, of melting point from about 50° to 140° C., (c) from 1 to 10% by weight of at least one non-ionic emulsifier, at least one alkali metal salt of a montan wax acid or a mixture of (α) at least one non-ionic emulsifier and (β) at least one alkali metal salt of a montan wax acid or alkali metal $C_{10}$–$C_{20}$-fatty alcohol-sulfate and/or alkali metal $C_{10}$–$C_{20}$-alkanesulfonate, or a mixture of these, (d) from 0 to 20% by weight of one or more pigments, one or more fillers or a mixture of these and (e) from 0 to 60% by weight of volatile constituents, the wall material of the microcapsules (a) being a polymeric melamine-formaldehyde condensate which is obtained by condensing melamine with formaldehyde or condensing methylolmelamines and/or their methyl ethers, using a ratio of melamine to formaldehyde of from 1:2 to 1:6, at a pH of from 3.5 to 5.5 and at from 60° to 100° C., and then hardening for from 2 to 10 hours at from 60° to 100° C., the ratio of core material to wall material in the capsules being from 1:15 to 1:2 and the microcapsules having a diameter of from 2 to 10 μm.

2. A wax composition as claimed in claim 1, wherein (c) consists of at least one alkali metal salt of a montan wax acid or a mixture of (α) a non-ionic emulsifier and (β) at least one alkali metal salt of a montan wax acid, an alkali metal $C_{10}$–$C_{20}$-fatty alcohol-sulfate or an alkali metal $C_{10}$–$C_{20}$-alkanesulfonate, or a mixture of these.

3. A wax composition as claimed in claim 1, wherein (c) consists of an adduct of from 13 to 30 moles of ethylene oxide with one mole of tallow alcohol, stearyl alcohol, a partially unsaturated $C_{16}$–$C_{18}$-alkanol mixture or a mixture of these, or a mixture of (α) these adducts and (β) at least one alkali metal salt of a montan wax acid, an alkali metal $C_{10}$–$C_{20}$-fatty alcohol-sulfate or an alkali metal $C_{10}$–$C_{20}$-alkanesulfonate, or a mixture of these.

4. A wax composition as claimed in claim 1, wherein (c) consists of at least one alkali metal salt of montan wax acids or of a mixture of such an alkali metal salt and at least one adduct of from 15 to 25 moles of ethylene oxide with one mole of tallow alcohol, stearyl alcohol, a partially unsaturated $C_{16}$–$C_{18}$-alkanol mixture or a mixture of these.

5. A wax composition as claimed in claim 1 or 2 or 3 or 4, which contains from 3 to 10% by weight, based on (a+b+c), of (c).

6. A wax composition as claimed in claim 1, which contains additional components (f) conventionally used in wax compositions.

7. A wax composition as claimed in claim 1, wherein (b) consists of natural waxes, synthetic waxes or mixtures of these.

8. A wax composition as claimed in claim 1, wherein (b) consists of vegetable waxes, hydrocarbon waxes, montan wax, waxes prepared from montan wax, polyethylene waxes, oxidized microcrystalline waxes or mixtures of these.

9. A wax composition as claimed in claim 1 or 2 or 3 or 4, which contains from 1 to 15% by weight, based on (a+b+c), of water as component (e).

* * * * *